United States Patent
Decesaris et al.

(10) Patent No.: US 9,411,770 B2
(45) Date of Patent: Aug. 9, 2016

(54) CONTROLLING A PLURALITY OF SERIAL PERIPHERAL INTERFACE ('SPI') PERIPHERALS USING A SINGLE CHIP SELECT

(75) Inventors: Michael Decesaris, Carrboro, NC (US); Luke D. Remis, Raleigh, NC (US); Gregory D. Sellman, Morrisville, NC (US); Steven L. Vanderlinden, Chapel Hill, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 532 days.

(21) Appl. No.: 13/545,581

(22) Filed: Jul. 10, 2012

(65) Prior Publication Data
US 2014/0019644 A1    Jan. 16, 2014

(51) Int. Cl.
G06F 3/00    (2006.01)
G06F 13/12    (2006.01)
G06F 13/42    (2006.01)

(52) U.S. Cl.
CPC ................... G06F 13/4291 (2013.01)

(58) Field of Classification Search
None
See application file for complete search history.

(56) References Cited

U.S. PATENT DOCUMENTS

| | | | |
|---|---|---|---|
| 6,055,145 A * | 4/2000 | Lagree | G06J 1/00 361/115 |
| 6,931,470 B2 | 8/2005 | Ballantyne et al. | |
| 2004/0034728 A1 * | 2/2004 | Chang | G06F 1/1626 710/301 |
| 2006/0059286 A1 * | 3/2006 | Bertone | G06F 9/30014 710/260 |
| 2008/0126588 A1 * | 5/2008 | Chong | G06F 13/387 710/13 |
| 2008/0235411 A1 | 9/2008 | Zhang et al. | |
| 2008/0320247 A1 * | 12/2008 | Morfey | G06F 1/24 711/154 |

(Continued)

OTHER PUBLICATIONS

"Using SPI Chip Select Pin on C674x/OMAP-L1x—Texas Instruments Embedded Processors Wiki," http://processors.wiki.ti.com/index.php/Using_SPI_Chip_Select_Pin_on_C674x/OMAP-L1x, See "Configuring SPI_CS Polarity", Accessed Mar. 22, 2012, 1 page.

(Continued)

*Primary Examiner* — Henry Tsai
*Assistant Examiner* — Christopher Bartels
(74) *Attorney, Agent, or Firm* — Edward J. Lenart; Katherine S. Brown; Kennedy Lenart Spraggins LLP

(57) ABSTRACT

Controlling a plurality of serial peripheral interface ('SPI') peripherals using a single chip select in a computing system, the computing system including an SPI master, a first SPI peripheral, and a second SPI peripheral, wherein the first SPI peripheral is operatively coupled to the second SPI peripheral, including: receiving, by the first SPI peripheral, a signal from the SPI master; determining, by the first SPI peripheral, whether the first SPI peripheral is a primary SPI peripheral or a backup SPI peripheral; responsive to determining that the first SPI peripheral is the backup SPI peripheral, transmitting, by the first SPI peripheral to the second SPI peripheral, the signal; and responsive to determining that the first SPI peripheral is the primary SPI peripheral: servicing, by the first SPI peripheral, an instruction contained in the signal; and transmitting, by the first SPI peripheral to the second SPI peripheral, a response signal.

16 Claims, 5 Drawing Sheets

(56) References Cited

U.S. PATENT DOCUMENTS

| | | | |
|---|---|---|---|
| 2009/0138749 A1* | 5/2009 | Moll | G06F 13/423 713/503 |
| 2010/0138576 A1* | 6/2010 | Goerlich | G06F 13/4291 710/110 |
| 2010/0259221 A1* | 10/2010 | Tabatowski-Bush | H01M 10/4207 320/134 |
| 2010/0325326 A1* | 12/2010 | Huang et al. | 710/110 |
| 2011/0060856 A1 | 3/2011 | Huang et al. | |
| 2011/0072297 A1* | 3/2011 | Huang | 713/500 |
| 2011/0153889 A1* | 6/2011 | Barrenscheen | H04L 12/403 710/110 |
| 2011/0225339 A1* | 9/2011 | Chen | 710/313 |
| 2012/0072628 A1* | 3/2012 | Crockett et al. | 710/110 |
| 2013/0297829 A1* | 11/2013 | Berenbaum | G06F 13/4256 710/3 |

OTHER PUBLICATIONS

"Joint Test Action Group—Wikipedia, the free encyclopedia," http://webcache.googleusercontent.com/search?q=cache:oRF3vUqBqTgJ:en.wikipedia.org/wiki/Joint_Test_Action_Group+&cd=1&hl=en&ct=clnk&gl=us&client=firefox-a, Accessed Mar. 22, 2012, 14 pages.

Motorola TDB, et al.; "Gray Code SPI Addressing Technique", IP.com Prior Art Database, IPCOM000008643D, Jul. 1, 2002, pp. 1-4, USA.

IEEE (via SPI), et al.; "The Evolution of Peripheral Devices in Microprocessor Systems", IP.com Prior Art Database, IPCOM000131317D, Nov. 10, 2005, pp. 1-9, USA.

* cited by examiner

US 9,411,770 B2

CONTROLLING A PLURALITY OF SERIAL PERIPHERAL INTERFACE ('SPI') PERIPHERALS USING A SINGLE CHIP SELECT

BACKGROUND OF THE INVENTION

1. Field of the Invention

The field of the invention is data processing, or, more specifically, methods, apparatus, and products for controlling a plurality of serial peripheral interface ('SPI') peripherals using a single chip select.

2. Description of Related Art

Many devices used in server applications rely heavily on the use of SPI ROMs to retrieve initial boot code. Such SPI ROMs, however, can become corrupted over time. Providing a mechanism for backing up the contents of an SPI ROM can therefore improve system reliability.

SUMMARY OF THE INVENTION

Methods, apparatus, and products for controlling a plurality of serial peripheral interface ('SPI') peripherals using a single chip select in a computing system, the computing system including an SPI master, a first SPI peripheral, and a second SPI peripheral, wherein the first SPI peripheral is operatively coupled to the second SPI peripheral, including: receiving, by the first SPI peripheral, a signal from the SPI master; determining, by the first SPI peripheral, whether the first SPI peripheral is a primary SPI peripheral or a backup SPI peripheral; responsive to determining that the first SPI peripheral is the backup SPI peripheral, transmitting, by the first SPI peripheral to the second SPI peripheral, the signal; and responsive to determining that the first SPI peripheral is the primary SPI peripheral: servicing, by the first SPI peripheral, an instruction contained in the signal; and transmitting, by the first SPI peripheral to the second SPI peripheral, a response signal.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
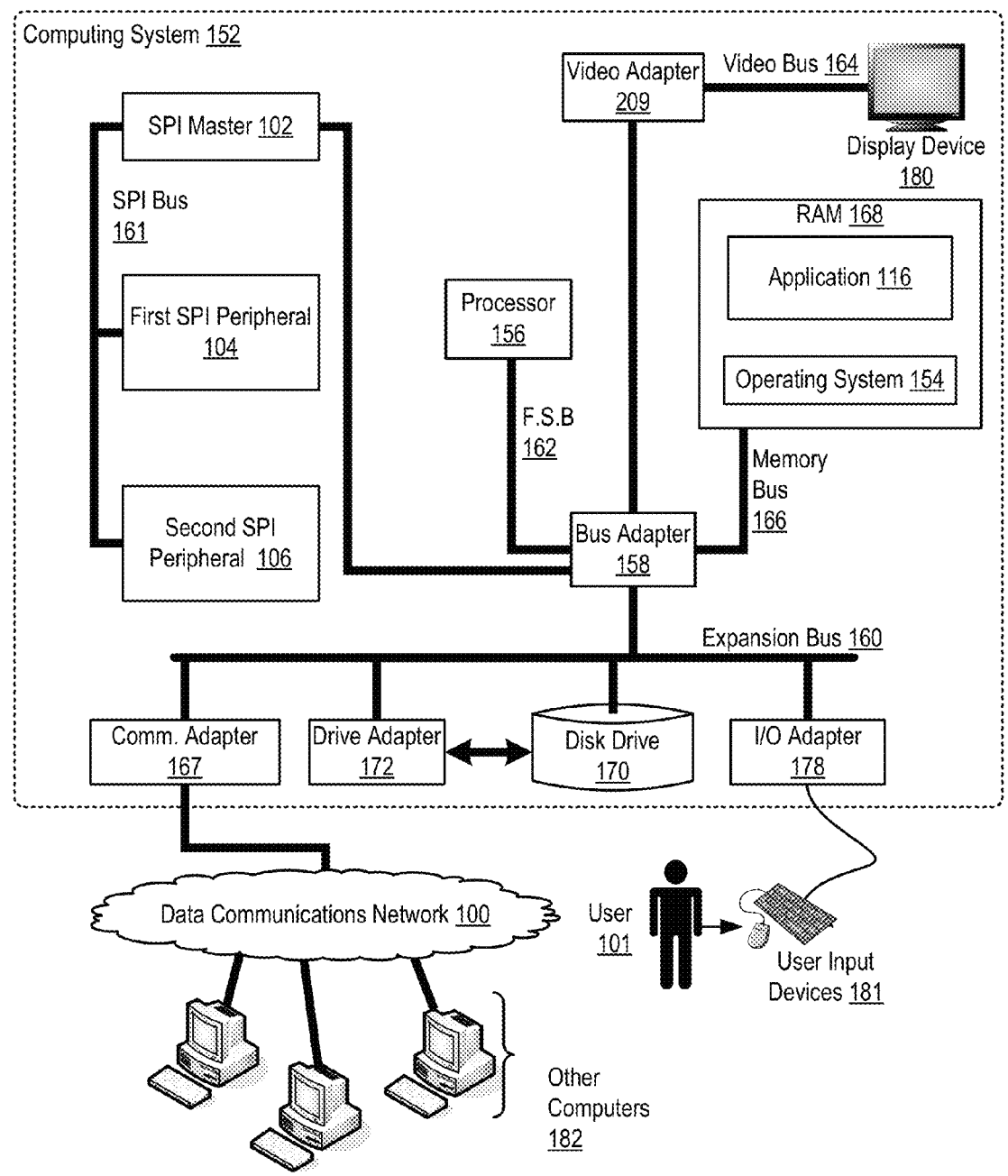
FIG. 1 sets forth a block diagram of automated computing machinery comprising an example computing system useful in controlling a plurality of SPI peripherals using a single chip select in accordance with embodiments of the present invention.

Example methods, apparatus, and products for controlling a plurality of serial peripheral interface ('SPI') peripherals using a single chip select in accordance with the present invention are described with reference to the accompanying drawings, beginning with FIG. 1. FIG. 1 sets forth a block diagram of automated computing machinery comprising an example computing system (152) useful in controlling a plurality of SPI peripherals using a single chip select according to embodiments of the present invention. The computing system (152) of FIG. 1 includes at least one computer processor (156) or 'CPU' as well as random access memory (168) ('RAM') which is connected through a high speed memory bus (166) and bus adapter (158) to processor (156) and to other components of the computing system (152).

Stored in RAM (168) is an application (116), a module of computer program instructions for carrying out user-level data processing tasks. Examples of such applications include word processing applications, spreadsheet applications, multimedia library and playback applications, presentation applications, database applications, and so on. Also stored in RAM (168) is an operating system (154). Operating systems useful for controlling a plurality of SPI peripherals (104, 106) using a single chip select according to embodiments of the present invention include UNIX™ Linux™ Microsoft XP™ Windows 7™ AIX™ IBM's i5/OS™ and others as will occur to those of skill in the art. The operating system (154) and application (116) in the example of FIG. 1 are shown in RAM (168), but many components of such software typically are stored in non-volatile memory also, such as, for example, on a disk drive (170).

The computing system (152) of FIG. 1 includes a first SPI peripheral (104) and a second SPI peripheral (106) in accordance with embodiments of the present invention. Each SPI peripheral (104, 106) represents a peripheral computing device configured for data communications using an SPI bus (161). SPI peripherals (104, 106) can include, for example, communications adapters such as an Ethernet adapter, a Universal Serial Bus ('USB') adapter, memory devices such as flash memory, an option ROM, an Electrically Erasable Programmable Read-Only Memory ('EEPROM'), and other peripheral devices as will occur to those of skill in the art. SPI devices communicate in a master/slave mode where the master device initiates a data frame, and as such, the computing system (152) of FIG. 1 also includes an SPI master (102).

The computing system (152) of FIG. 1 can control a plurality of SPI peripherals (104, 106) using a single chip select according to embodiments of the present invention by receiving, by the first SPI peripheral (104), a signal from the SPI master (102). The signal represents an instruction sent from the SPI master (102) to an SPI peripheral (104, 106) to perform some operation, data associated with such an instruction, or any combination thereof. For example, the signal may include an instruction to read data from a location in an SPI peripheral (104, 106), an instruction to write data to a location in an SPI peripheral (104, 106), the data that is to be written to a location in an SPI peripheral (104, 106), and so on. The signal may be received by the first SPI peripheral (104), for example, via a master-output, slave-input ('MOSI') interface that is connected to a signal line used to transmit data from the SPI master (102) to the first SPI peripheral (104).

The computing system (152) of FIG. 1 can further control a plurality of SPI peripherals (104, 106) using a single chip select according to embodiments of the present invention by determining, by the first SPI peripheral (104), whether the first SPI peripheral (104) is a primary SPI peripheral or a backup SPI peripheral. Determining whether the first SPI peripheral (104) is a primary SPI peripheral or a backup SPI peripheral may be carried out, for example, using a polarity signal. Such a polarity signal may be embodied, for example, as a bit value, as a voltage level of a signal, and so on. In such an example, the value of the polarity signal may indicate that a particular SPI peripheral that receives the polarity signal is either a primary SPI peripheral or a backup SPI peripheral.

For example, a polarity signal with a voltage level below a predetermined threshold voltage level may indicate that the particular SPI peripheral that receives the polarity signal is a backup SPI peripheral. Likewise, a polarity signal with a voltage level that is above the predetermined threshold voltage level may indicate that the particular SPI peripheral that receives the polarity signal is a primary SPI peripheral. In such an example, an SPI peripheral that is designated as the 'primary' SPI peripheral will be responsible for servicing the instructions contained in a signal received via a MOSI interface of the SPI peripheral. Alternatively, an SPI peripheral that is designated as the 'backup' SPI peripheral will be responsible for simply passing along a signal that was received via the MOSI interface of the SPI peripheral by transmitting the signal from the SPI peripheral using a master-input, slave-output ('MISO') interface of the SPI peripheral.

The computing system (152) of FIG. 1 can further control a plurality of SPI peripherals (104, 106) using a single chip select according to embodiments of the present invention transmitting, by the first SPI peripheral (104) to the second SPI peripheral (106), the signal received from the SPI master (102). The first SPI peripheral (104) may transmit the signal to the second SPI peripheral (106) in response to determining that the first SPI peripheral (104) is the backup SPI peripheral. In such an example, because the first SPI peripheral (104) has determined that it is the backup SPI peripheral, the first SPI peripheral (104) is not responsible for servicing the signal. The first SPI peripheral (104) will simply act as a pass-through for the signal.

The computing system (152) of FIG. 1 can alternatively control a plurality of SPI peripherals (104, 106) using a single chip select according to embodiments of the present invention by servicing, by the first SPI peripheral (104), an instruction contained in the signal received from the SPI master (102). The first SPI peripheral (104) can service an instruction contained in the signal in response to determining that the first SPI peripheral (104) is the primary SPI peripheral. Servicing an instruction contained in the signal may be carried out, for example, by executing an operation identified in the signal. For example, the signal may include an instruction to read data from a specified memory location such that servicing an instruction contained in the signal may be carried out by reading the data contained at the specified memory location.

The computing system (152) of FIG. 1 can further control a plurality of SPI peripherals (104, 106) using a single chip select according to embodiments of the present invention transmitting, by the first SPI peripheral (104) to the second SPI peripheral (106), a response signal. The response signal represents a signal generated by the first SPI peripheral (104) in response to servicing the instruction contained in the signal. Transmitting a response signal from the first SPI peripheral (104) to the second SPI peripheral (106) is also carried out in response to determining that the first SPI peripheral (104) is the primary SPI peripheral.

Consider the example described above in which the signal included an instruction to read data from a specified memory location. In such an example, the first SPI peripheral (104) can generate a response signal that includes the data contained at the specified memory location. The first SPI peripheral (104) can subsequently transmit the response signal using the MISO interface of the first SPI peripheral (104). In embodiments of the present invention, the MISO interface of the first SPI peripheral (104) is connected via a signal line to the MOSI interface of the second SPI peripheral (106). As such, the response signal is transmitted by the first SPI peripheral (104) to the second SPI peripheral (106).

The computing system (152) of FIG. 1 also includes disk drive adapter (172) coupled through expansion bus (160) and bus adapter (158) to processor (156) and other components of the computing system (152). Disk drive adapter (172) connects non-volatile data storage to the computing system (152) in the form of disk drive (170). Disk drive adapters useful in computers for controlling a plurality of SPI peripherals (104, 106) using a single chip select according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user (101) input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers (182) and for data communications with a data communications network (100). Such data communications may be carried out serially through RS-232 connections, through external buses such as a USB, through data communications networks such as IP data communications networks, and in other ways as will occur to those of skill in the art. Communications adapters implement the hardware level of data communications through which one computer sends data communications to another computer, directly or through a data communications network. Examples of communications adapters useful for controlling a plurality of SPI peripherals (104, 106) using a single chip select according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
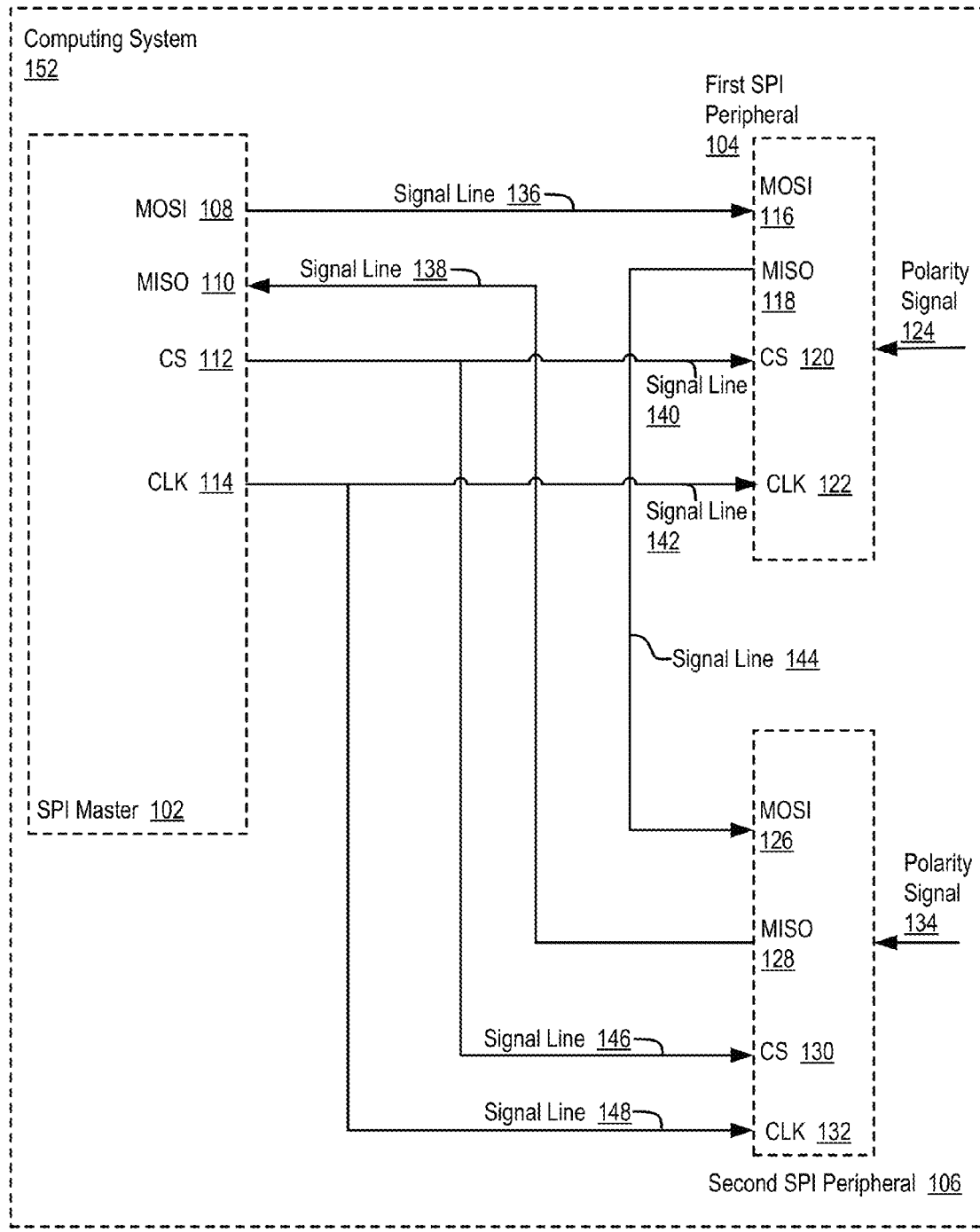
FIG. 2 sets forth a block diagram of a computing system that includes a first SPI peripheral and a second SPI peripheral in accordance with embodiments of the present invention.

For further explanation, FIG. 2 sets forth a block diagram of a computing system (152) that includes a first SPI peripheral (104) and a second SPI peripheral (106) in accordance with embodiments of the present invention. Each SPI peripheral (104, 106) represents a peripheral computing device configured for data communications using an SPI bus. SPI peripherals (104, 106) can include, for example, communications adapters such as an Ethernet adapter, a USB adapter, memory devices such as flash memory, an option ROM, an EEPROM, and other peripheral devices as will occur to those of skill in the art. SPI devices communicate in a master/slave mode where the master device initiates a data frame, and as such, the computing system (152) of FIG. 2 also includes an SPI master (102).

The SPI master (102) of FIG. 2 includes four interfaces to various signal lines (136, 138, 140, 142, 146, 148). Each interface may be embodied, for example, as a pin. The SPI master (102) includes a master-output, slave-input ('MOSI') (108) interface for transmitting data from the SPI master (102) to the first SPI peripheral (104). The SPI master (102) also includes a master-input, slave-output ('MISO') (110) interface for receiving data from the second SPI peripheral (106). The SPI master (102) also includes a chip select ('CS') (112) interface that, in standard operation, would be used to select the particular SPI peripheral (104, 106) that is to receive a data transmission from the SPI master (102). In embodiments of the present invention, however, the SPI master (102) always sends data to the first SPI peripheral (104) and always receives data from the second SPI peripheral (106). The SPI master (102) also includes a clock ('CLK') interface (114) for sending a clock signal to each of the SPI peripherals (104, 106).

Figure 4:
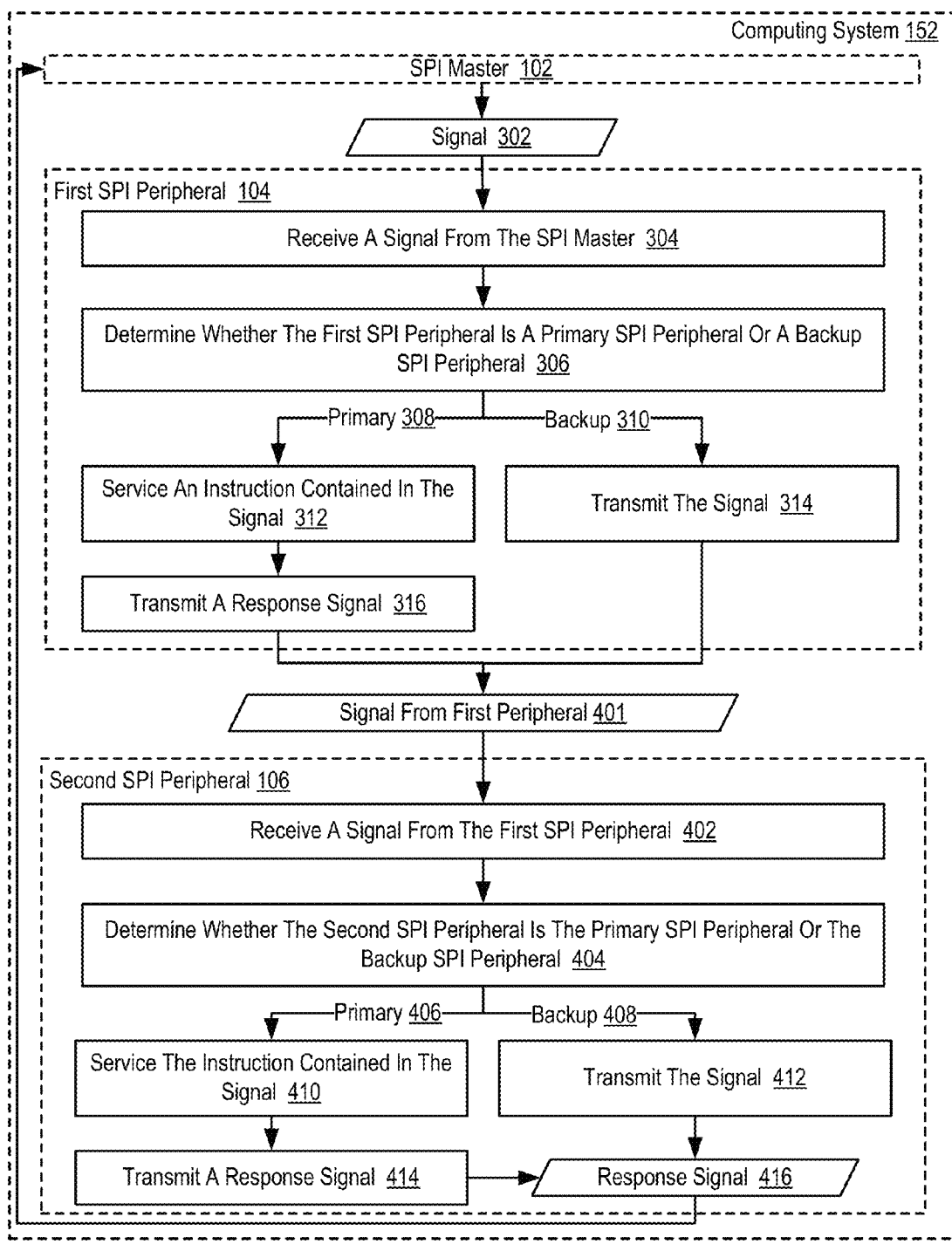
FIG. 4 sets forth a flow chart illustrating a further example method for controlling a plurality of SPI peripherals using a single chip select in a computing system according to embodiments of the present invention.

In the example of FIG. 2, the first SPI peripheral (104) also includes four interfaces. The first SPI peripheral (104) includes a MOSI (116) interface for receiving data from the SPI master (102). The first SPI peripheral (104) also includes a CS (120) interface for receiving a chip select signal and a CLK (122) interface for receiving a clock signal. The first SPI peripheral (104) also includes a MISO (118) interface for sending data from the first SPI peripheral (104) to a recipient. In the example of FIG. 4, the MISO (118) interface of the first SPI peripheral (104) is connected to a MOSI (126) interface on the second SPI peripheral (106) via a signal line (144) such that data transmitted from the first SPI peripheral (104) always goes to the second SPI peripheral (106).

In the example of FIG. 2, the second SPI peripheral (106) also includes four interfaces. The second SPI peripheral (106) includes a MOSI (126) interface for receiving data from the first SPI peripheral (104). The second SPI peripheral (106) also includes a CS (130) interface for receiving a chip select signal and a CLK (132) interface for receiving a clock signal. The second SPI peripheral (106) also includes a MISO (128) interface for sending data from the second SPI peripheral (106) to a recipient. In the example of FIG. 4, the MISO (128) interface of the second SPI peripheral (106) is connected to the MISO (110) interface of the SPI master (102) via a signal line (138) such that data transmitted from the second SPI peripheral (106) always goes to the SPI master (102).

In the example of FIG. 2, each SPI peripheral (104, 106) also includes an interface for receiving a polarity signal (124, 134). Each polarity signal (124, 134) may be embodied, for example, as a bit value, as a voltage level of a signal, and so on. In such an example, the value of each polarity signal (124, 134) may indicate that a particular SPI peripheral (104, 106) that receives the polarity signal (124, 134) is either a primary SPI peripheral or a backup SPI peripheral.

For example, a polarity signal (124, 134) with a voltage level below a predetermined threshold voltage level may indicate that the particular SPI peripheral that receives the polarity signal (124, 134) is a backup SPI peripheral. Likewise, a polarity signal (124, 134) with a voltage level that is above the predetermined threshold voltage level may indicate that the particular SPI peripheral that receives the polarity signal is a primary SPI peripheral. In such an example, an SPI peripheral that is designated as the 'primary' SPI peripheral will be responsible for servicing the instructions contained in a signal received via the MOSI (116, 126) interface of the SPI peripheral (104, 106). Alternatively, an SPI peripheral that is designated as the 'backup' SPI peripheral will be responsible for simply passing along a signal that was received via the MOSI (116, 126) interface of the SPI peripheral by transmitting the signal from the SPI peripheral using a MISO interface (118, 128) of the SPI peripheral (104, 106).

Figure 3:
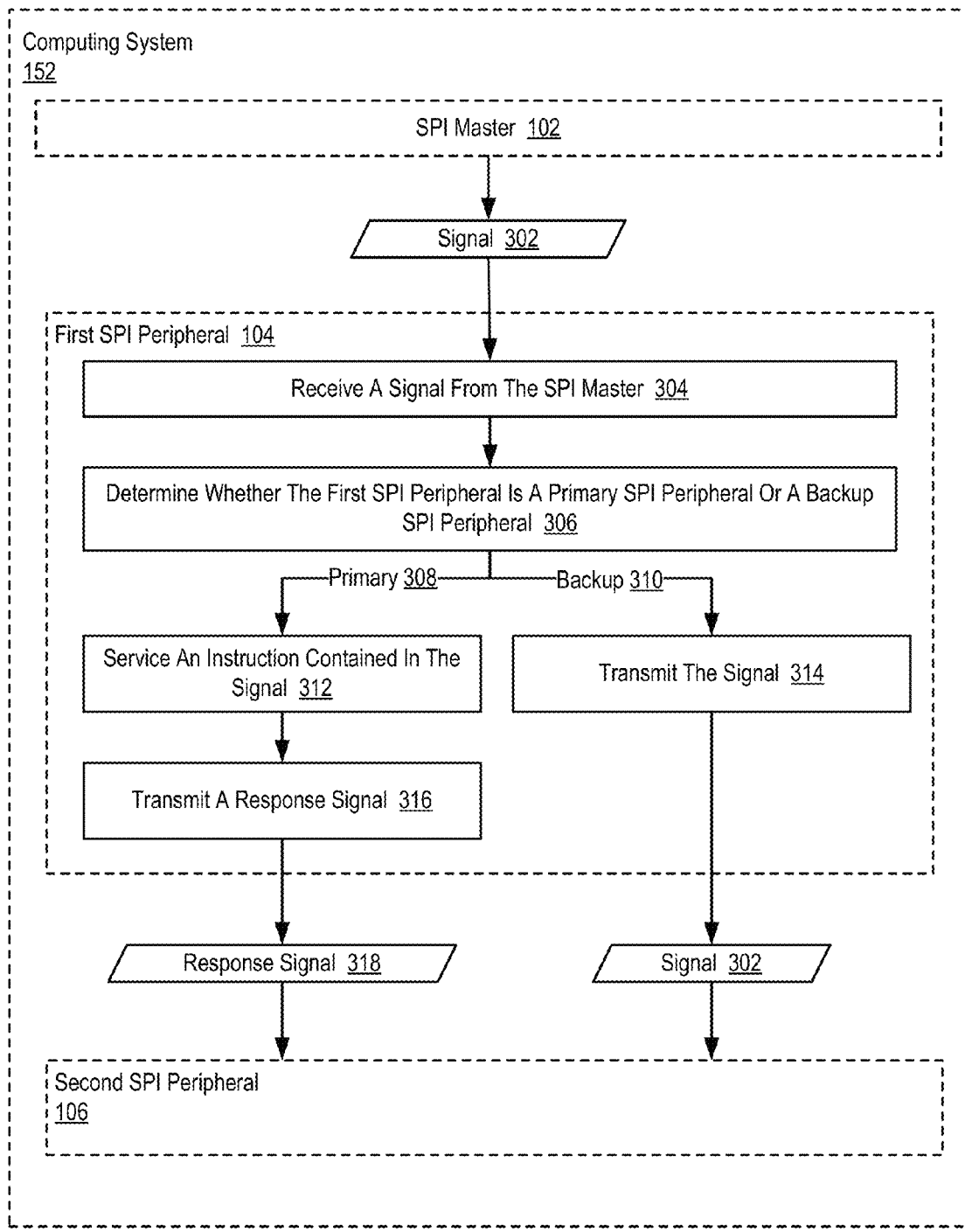
FIG. 3 sets forth a flow chart illustrating an example method for controlling a plurality of SPI peripherals using a single chip select in a computing system according to embodiments of the present invention.

For further explanation, FIG. 3 sets forth a flow chart illustrating an example method for controlling a plurality of SPI peripherals (104, 106) using a single chip select in a computing system (152) according to embodiments of the present invention. The computing system (152) of FIG. 3 includes a first SPI peripheral (104) and a second SPI peripheral (106). In the example of FIG. 3, each SPI peripheral (104, 106) represents a peripheral computing device configured for data communications using an SPI bus. SPI peripherals (104, 106) can include, for example, communications adapters such as an Ethernet adapter, a USB adapter, memory devices such as flash memory, an option ROM, an EEPROM, and other peripheral devices as will occur to those of skill in the art. SPI devices communicate in a master/slave mode where the master device initiates a data frame, and as such, the computing system (152) of FIG. 3 also includes an SPI master (102). In the example method of FIG. 3, the first SPI peripheral (104) is operatively coupled to the second SPI peripheral (106), for example, as described above and illustrated in FIG. 2.

The example method of FIG. 3 includes receiving (304), by the first SPI peripheral (104), a signal (302) from the SPI master (102). In the example method of FIG. 3, the signal (302) represents an instruction sent from the SPI master (102) to an SPI peripheral (104, 106) to perform some operation, data associated with such an instruction, or any combination thereof. For example, the signal (302) may include an instruction to read data from a location in an SPI peripheral (104, 106), an instruction to write data to a location in an SPI peripheral (104, 106), the data that is to be written to a location in an SPI peripheral (104, 106), and so on. In the example method of FIG. 3, the signal (302) is received (304) by the first SPI peripheral (104), for example, via a MOSI interface that is connected to a signal line used to transmit data from the SPI master (102) to the first SPI peripheral (104) as illustrated above with reference to FIG. 2.

The example method of FIG. 3 also includes determining (306), by the first SPI peripheral (104), whether the first SPI peripheral (104) is a primary SPI peripheral or a backup SPI peripheral. In the example method of FIG. 3, determining (306) whether the first SPI peripheral (104) is a primary SPI peripheral or a backup SPI peripheral may be carried out, for example, using a polarity signal as illustrated above with reference to FIG. 2. Such a polarity signal may be embodied, for example, as a bit value, as a voltage level of a signal, and so on. In such an example, the value of the polarity signal may indicate that a particular SPI peripheral that receives the polarity signal is either a primary SPI peripheral or a backup SPI peripheral.

For example, a polarity signal with a voltage level below a predetermined threshold voltage level may indicate that the particular SPI peripheral that receives the polarity signal is a backup SPI peripheral. Likewise, a polarity signal with a voltage level that is above the predetermined threshold voltage level may indicate that the particular SPI peripheral that receives the polarity signal is a primary SPI peripheral. In such an example, an SPI peripheral that is designated as the 'primary' SPI peripheral will be responsible for servicing the instructions contained in a signal received over a MOSI signal line for the SPI peripheral. Alternatively, an SPI peripheral that is designated as the 'backup' SPI peripheral will be responsible for simply passing along a signal that was received via the MOSI interface of the SPI peripheral by transmitting the signal from the SPI peripheral using a MISO interface of the SPI peripheral.

The example method of FIG. 3 also includes transmitting (314), by the first SPI peripheral (104) to the second SPI peripheral (106), the signal (302). In the example method of FIG. 3, the first SPI peripheral (104) may transmit (314) the signal (302) to the second SPI peripheral (106) in response to determining that the first SPI peripheral (104) is the backup (310) SPI peripheral. In such an example, because the first SPI peripheral (104) has determined that it is the backup (310) SPI peripheral, the first SPI peripheral (104) is not responsible for servicing the signal (302). The first SPI peripheral (104) will simply act as a pass-through for the signal (302). In the example method of FIG. 3, transmitting (314) the signal (302) from the first SPI peripheral (104) to the second SPI peripheral (106) may be carried out by the first SPI peripheral (104) transmitting the signal (302) using the MISO interface of the first SPI peripheral (104). Because the MISO interface of the first SPI peripheral (104) is connected to a signal line that terminates at the MOSI interface of the second SPI peripheral (106), as illustrated above with reference to FIG. 2, a signal that is transmitted from the MISO interface of the first SPI peripheral (104) will be received at the MOSI interface of the second SPI peripheral (106).

The example method of FIG. 3 also includes servicing (312), by the first SPI peripheral (104), an instruction contained in the signal (302). In the example method of FIG. 3, the first SPI peripheral (104) can service (312) an instruction contained in the signal (302) in response to determining that the first SPI peripheral (104) is the primary (308) SPI peripheral. Servicing (312) an instruction contained in the signal (302) may be carried out, for example, by executing an operation identified in the signal (302). For example, the signal (302) may include an instruction to read data from a specified memory location such that servicing (312) an instruction contained in the signal (302) may be carried out by reading the data contained at the specified memory location.

The example method of FIG. 3 also includes transmitting (316), by the first SPI peripheral (104) to the second SPI peripheral (106), a response signal (318). In the example method of FIG. 3, the response signal (318) represents a signal generated by the first SPI peripheral (104) in response to servicing (312), by the first SPI peripheral (104), the instruction contained in the signal (302). In the example method of FIG. 3, transmitting (316) a response signal (318) from the first SPI peripheral (104) to the second SPI peripheral (106) is also carried out in response to determining that the first SPI peripheral (104) is the primary (308) SPI peripheral.

Consider the example described above in which the signal (302) included an instruction to read data from a specified memory location. In such an example, the first SPI peripheral (104) can generate a response signal (318) that includes the data contained at the specified memory location. The first SPI peripheral (104) can subsequently transmit the response signal (318) using the MISO interface of the first SPI peripheral (104). Because the MISO interface is connected via a signal line to the MOSI interface of the second SPI peripheral (106), however, the response signal (318) is transmitted (316) by the first SPI peripheral (104) to the second SPI peripheral (106).

For further explanation, FIG. 4 sets forth a flow chart illustrating a further example method for controlling a plurality of SPI peripherals (104, 106) using a single chip select in a computing system (152) according to embodiments of the present invention. The computing system (152) of FIG. 4 is similar to the computing system of FIG. 3 as it also includes a first SPI peripheral (104), a second SPI peripheral (106), and an SPI master (102). In the example method of FIG. 4, the first SPI peripheral (104) is operatively coupled to the second SPI peripheral (106), for example, as described above and illustrated in FIG. 2. The example method of FIG. 4 is similar to the example method of FIG. 3 as it can also include receiving (304) a signal (302) from the SPI master (102), determining (306) whether the first SPI peripheral (104) is a primary SPI peripheral or a backup SPI peripheral, transmitting (314) the signal (302) servicing (312) the signal (302), and transmitting (316) a response signal (318).

The example method of FIG. 4 also includes receiving (402), by the second SPI peripheral (104), a signal (401) from the first SPI peripheral (104). In the example method of FIG. 4, if the first SPI peripheral (104) is the primary SPI peripheral, the signal (401) from the first SPI peripheral (104) may be embodied as a response signal (318 of FIG. 3) as described above. Alternatively, if the first SPI peripheral (104) is the backup SPI peripheral the signal (401) from the first SPI peripheral (104) may be embodied as the signal (302 of FIG. 3) received from the SPI master (102). In the example method of FIG. 4, the signal (401) from the first SPI peripheral (104) is received by the second SPI peripheral (106) via the MOSI interface of the second SPI peripheral (106), which is connected to the MISO interface of the first SPI peripheral (104) via a signal line as described above with reference to FIG. 2.

The example method of FIG. 4 also includes determining (404), by the second SPI peripheral (106), whether the second SPI peripheral (106) is the primary SPI peripheral or the backup SPI peripheral. In the example method of FIG. 4, determining (404) whether the second SPI peripheral (106) is a primary SPI peripheral or a backup SPI peripheral may be carried out, for example, using a polarity signal as illustrated above with reference to FIG. 2. Such a polarity signal may be embodied, for example, as a bit value, as a voltage level of a signal, and so on. In such an example, the value of the polarity signal may indicate that a particular SPI peripheral that receives the polarity signal is either a primary SPI peripheral or a backup SPI peripheral.

For example, a polarity signal with a voltage level below a predetermined threshold voltage level may indicate that the particular SPI peripheral that receives the polarity signal is a backup SPI peripheral. Likewise, a polarity signal with a voltage level that is above the predetermined threshold voltage level may indicate that the particular SPI peripheral that receives the polarity signal is a primary SPI peripheral. In such an example, an SPI peripheral that is designated as the 'primary' SPI peripheral will be responsible for servicing the instructions contained in a signal received over a MOSI signal line for the SPI peripheral. Alternatively, an SPI peripheral that is designated as the 'backup' SPI peripheral will be responsible for simply passing along a signal that was received via the MOSI interface by transmitting the signal from the SPI peripheral using a MISO interface of the SPI peripheral.

The example method of FIG. 4 also includes transmitting (412), by the second SPI peripheral (106) to the SPI master (102), the signal (401) from the first SPI peripheral (104). In the example method of FIG. 4, transmitting (412) the signal (401) to the SPI master (102) is carried out in response to determining that the second SPI peripheral (106) is the backup (408) SPI peripheral. In the example method of FIG. 4, the signal (401) may be transmitted (412) using the MISO interface of the second SPI peripheral (106). Because the MISO interface of the second SPI peripheral (106) is connected to the MISO interface of the SPI master (102) via a signal line, as described above with reference to FIG. 2, transmitting (412) the signal (401) using the MISO interface of the second SPI peripheral (106) causes the signal (401) to be sent to the SPI master (102). In such an example, because the second SPI peripheral (106) is the backup (408) SPI peripheral, the signal (401) represents a response signal (318 of FIG. 3) generated by the first SPI peripheral (104) in response to servicing the original signal (302) sent from the SPI master (102) to the first SPI peripheral (104).

The example method of FIG. 4 also includes servicing (410), by the second SPI peripheral (106), an instruction contained in the signal (401) from the first SPI peripheral (104). In the example method of FIG. 4, servicing (410) an instruction contained in the signal (401) from the first SPI peripheral (104) is carried out in response to determining that the second SPI peripheral (106) is the primary (406) SPI peripheral. In such an example, because the second SPI peripheral (106) is the primary (406) SPI peripheral, the first SPI peripheral (104) is therefore the backup SPI peripheral. As such, the signal (401) from the first SPI peripheral (104) represents a copy of the signal (302) from the SPI master (102) as the first SPI peripheral (104) acts as a pass-through for the signal (302) from the SPI master (102). In the example method of FIG. 4, servicing (410) an instruction contained in the signal (401) from the first SPI peripheral (104) may be carried out, for example, by executing an operation identified in the signal (401). For example, the signal (401) may include an instruction to read data from a specified memory location such that servicing (410) an instruction contained in the signal (401) may be carried out by reading the data contained at the specified memory location.

The example method of FIG. 4 also includes transmitting (414), by the second SPI peripheral (106) to the SPI master (102), a response signal (416). In the example method of FIG. 4, the response signal (416) represents a signal generated by an SPI peripheral (104, 106) in response to servicing an instruction contained in the signal (302) sent from the SPI master (102) to the first SPI peripheral (104). If the first SPI peripheral (104) is the primary SPI peripheral, the first SPI peripheral (104) will service the instruction contained in the signal (302) sent from the SPI master (102) to the first SPI peripheral (104) and subsequently send a response signal to the second SPI peripheral (106), which will simply act as a pass-through for the signal received from the first SPI peripheral (104). If the second SPI peripheral (106) is the primary SPI peripheral, the first SPI peripheral (104) simply act as a pass-through for the signal received from the SPI master (102) and the second SPI peripheral (106) will service the instruction contained in the signal (302) sent from the SPI master (102) to the first SPI peripheral (104) and will subsequently generate the response signal (416). Regardless of which SPI peripheral (104, 106) acts as the primary SPI peripheral, the signal (416) transmitted by the second SPI peripheral (106) will be a response signal (416) as one of the SPI peripherals (104, 106) will have serviced the instruction contained in the signal (302) sent from the SPI master (102) to the first SPI peripheral (104).

In the example method of FIG. 4, transmitting (414) the response signal (416) may be carried out by transmitting the signal (416) using the MISO interface of the second SPI peripheral (106). Because the MISO interface of the second SPI peripheral (106) is connected via a signal line to the MISO interface of the SPI master (102), transmitting (414) the response signal (416) using the MISO interface of the second SPI peripheral (106) will cause the response signal (416) to be transmitted to the SPI master (102).

Figure 5:
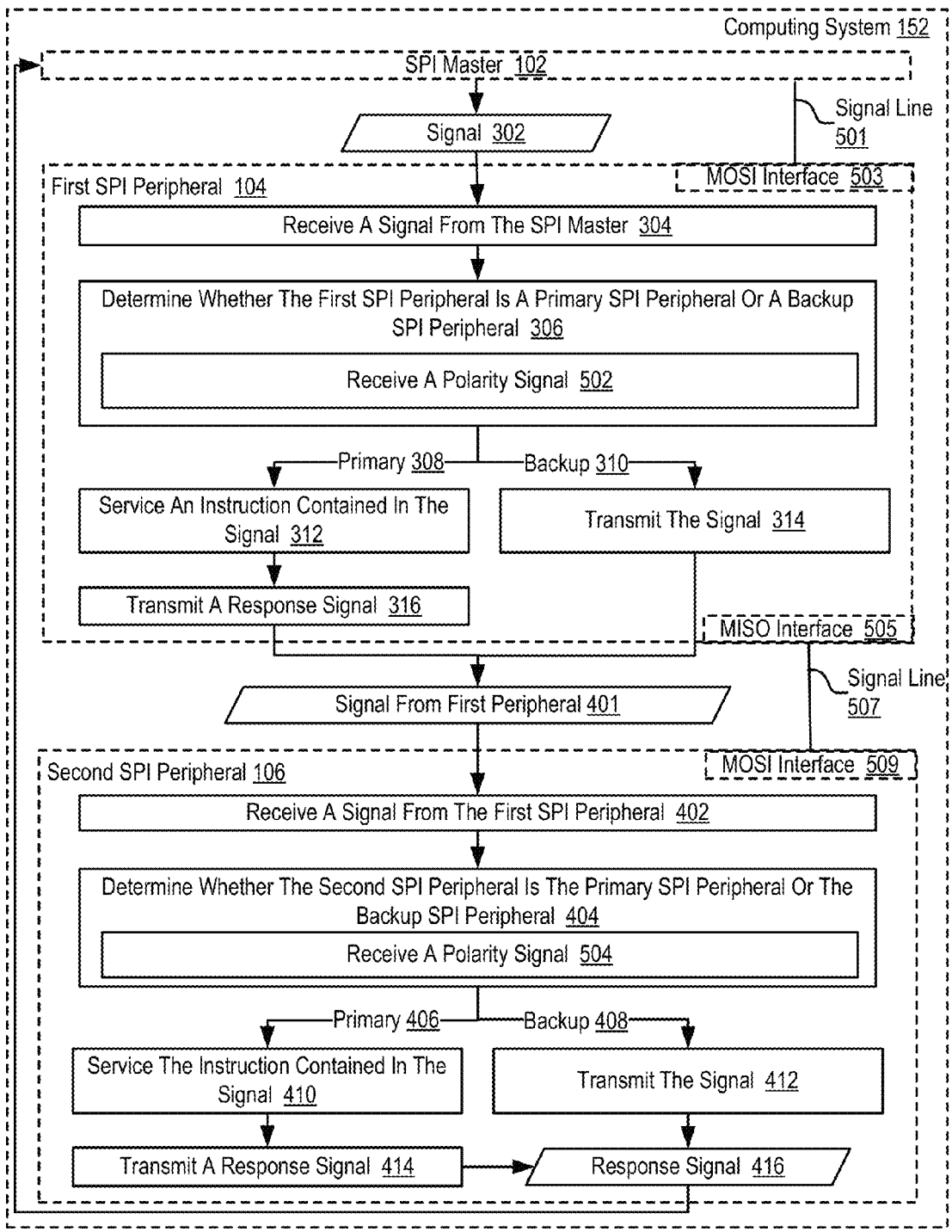
FIG. 5 sets forth a flow chart illustrating a further example method for controlling a plurality of SPI peripherals using a single chip select in a computing system according to embodiments of the present invention.

For further explanation, FIG. 5 sets forth a flow chart illustrating a further example method for controlling a plurality of SPI peripherals (104, 106) using a single chip select in a computing system (152) according to embodiments of the present invention. The example method of FIG. 5 is similar to the example methods of FIG. 3 and FIG. 4, as the example method of FIG. 5 includes many of the same steps described above with reference to FIG. 3 and FIG. 4.

In the example of FIG. 5, determining (306), by the first SPI peripheral (104), whether the first SPI peripheral (104) is a primary SPI peripheral or a backup SPI peripheral includes receiving (502), by the first SPI peripheral (104), a polarity signal. In the example of FIG. 5, determining (404), by the second SPI peripheral (106), whether the second SPI peripheral (106) is a primary SPI peripheral or a backup SPI peripheral also includes receiving (504), by the second SPI peripheral (106), a polarity signal. Such a polarity signal may be embodied, for example, as a bit value, as a voltage level of a signal, and so on. In such an example, the value of the polarity signal may indicate that a particular SPI peripheral that receives the polarity signal is either a primary SPI peripheral or a backup SPI peripheral.

For example, a polarity signal with a voltage level below a predetermined threshold voltage level may indicate that the particular SPI peripheral that receives the polarity signal is a backup SPI peripheral. Likewise, a polarity signal with a voltage level that is above the predetermined threshold voltage level may indicate that the particular SPI peripheral that receives the polarity signal is a primary SPI peripheral. In such an example, an SPI peripheral that is designated as the 'primary' SPI peripheral will be responsible for servicing the instructions contained in a signal received over a MOSI signal line for the SPI peripheral. Alternatively, an SPI peripheral that is designated as the 'backup' SPI peripheral will be responsible for simply passing along a signal that was received via the MOSI interface of the SPI peripheral by transmitting the signal from the SPI peripheral using a MISO interface of the SPI peripheral.

In the example method of FIG. 5, the signal (302) from the SPI master (102) is received by the first SPI peripheral (104) via a signal line (501) coupling a MOSI interface (503) of the first SPI peripheral (104) to the SPI master (106). In addition, the signal (401) from the first SPI peripheral (104) is transmitted to the second SPI peripheral (106) via a signal line (507) coupling a MISO interface (505) of the first SPI peripheral (104) to a MOSI interface (509) of the second SPI peripheral (106).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
   by program instructions on a computing device,
      receiving a first signal from a serial peripheral interface ('SPI') master, wherein the first signal is received by a first SPI peripheral directly coupled to the SPI master, and wherein the first SPI peripheral is operatively connected to a second SPI peripheral so that each peripheral is capable of servicing all instructions to the peripherals and only one peripheral executes each instruction;
      receiving a second signal indicating whether the first SPI peripheral is a primary SPI peripheral or a backup SPI peripheral, the second signal comprising a polarity signal characterized by a threshold with a second signal value higher than the threshold indicating that the first SPI peripheral is a primary SPI peripheral and a second signal value lower than the threshold indicating that the first SPI peripheral is a backup SPI peripheral;

responsive to determining that the second signal indicates that the first SPI peripheral is the backup SPI peripheral, transmitting the first signal to the second SPI peripheral; and responsive to determining that the second signal indicates that the first SPI peripheral is the primary SPI peripheral:

servicing an instruction contained in the first signal; and transmitting a response signal to the second SPI peripheral.

2. The method of claim 1 further comprising:

receiving the first signal from the first SPI peripheral;

receiving a third signal indicating whether a second SPI peripheral is the primary SPI peripheral or the backup SPI peripheral;

responsive to determining that the third signal indicates that the second SPI peripheral is the backup SPI peripheral, transmitting, to the SPI master, the first signal from the first SPI peripheral; and responsive to determining that the third signal indicates that the second SPI peripheral is the primary SPI peripheral:

servicing an instruction contained in the first signal from the first SPI peripheral; and transmitting a response signal to the SPI master.

3. The method of claim 2 wherein only one SPI peripheral is the primary SPI peripheral.

4. The method of claim 2 wherein only one SPI peripheral is the backup SPI peripheral.

5. The method of claim 1 wherein the third signal is a polarity signal.

6. The method of claim 1 wherein the first signal from the SPI master is received by the first SPI peripheral via a signal line coupling a master out, slave in ('MOSI') interface of the first SPI peripheral to the SPI master.

7. The method of claim 1 wherein the first signal from the first SPI peripheral is transmitted to the second SPI peripheral via a signal line coupling a master in, slave out ('MISO') interface of the first SPI peripheral to a MOSI interface of the second SPI peripheral.

8. The method of claim 1 wherein the each SPI peripheral is an option ROM.

9. An apparatus including a serial peripheral interface ('SPI') master, a first SPI peripheral, and a second SPI peripheral, wherein the first SPI peripheral is directly coupled to the second SPI peripheral so that each peripheral is capable of servicing all instructions to the peripherals and only one peripheral executes each instruction, wherein the first SPI peripheral carries out the steps of:

receiving a first signal from the SPI master;

receiving a second signal indicating whether the first SPI peripheral is a primary SPI peripheral or a backup SPI peripheral, the second signal comprising a polarity signal characterized by a threshold with a second signal value higher than the threshold indicating that the first SPI peripheral is a primary SPI peripheral and a second signal value lower than the threshold indicating that the first SPI peripheral is a backup SPI peripheral;

responsive to determining that the second signal indicates that the first SPI peripheral is the backup SPI peripheral, transmitting the first signal to the second SPI peripheral; and responsive to determining that the second signal indicates that the first SPI peripheral is the primary SPI peripheral:

servicing an instruction contained in the first signal; and transmitting, to the second SPI peripheral, a response signal.

10. The apparatus of claim 9 wherein the second SPI peripheral carries out the steps of:

receiving the first signal from the first SPI peripheral;

receiving a third signal indicating whether the second SPI peripheral is the primary SPI peripheral or the backup SPI peripheral;

responsive to determining that the third signal indicates that the second SPI peripheral is the backup SPI peripheral, transmitting, to the SPI master, the first signal from the first SPI peripheral; and responsive to determining that the third signal indicates that the second SPI peripheral is the primary SPI peripheral:

servicing, by the second SPI peripheral, an instruction contained in the signal from the first SPI peripheral; and transmitting, to the SPI master, a response signal.

11. The apparatus of claim 10 wherein the first signal from the first SPI peripheral is transmitted to the second SPI peripheral via a signal line coupling a master in, slave out ('MISO') interface of the first SPI peripheral to a MOSI interface of the second SPI peripheral.

12. The apparatus of claim 10 wherein only one SPI peripheral is the primary SPI peripheral.

13. The apparatus of claim 10 wherein only one SPI peripheral is the backup SPI peripheral.

14. The apparatus of claim 9 wherein the third signal is a polarity signal.

15. The apparatus of claim 9 wherein the first signal from the SPI master is received by the first SPI peripheral via a signal line coupling a master out, slave in ('MOSI') interface of the first SPI peripheral to the SPI master.

16. The apparatus of claim 9 wherein the each SPI peripheral is an option ROM.

* * * * *